DIGITAL MULTIPLIER EMPLOYING MATRIX OF NOR CIRCUITS

Original Filed Nov. 1, 1962 2 Sheets-Sheet 1

INVENTORS
Harold R. Dell
Merrill J. Maloney
BY Edward A. Robinson
ATTORNEY

DIGITAL MULTIPLIER EMPLOYING MATRIX OF NOR CIRCUITS

Original Filed Nov. 1, 1962 2 Sheets-Sheet 2

INVENTORS
HAROLD R. DELL
MERRILL J. MALONEY
BY Edward A. Robinson
ATTORNEY

3,346,729
DIGITAL MULTIPLIER EMPLOYING MATRIX OF NOR CIRCUITS

Harold R. Dell, Palo Alto, and Merrill J. Maloney, Mountain View, Calif., assignors to General Precision Systems Inc., a corporation of Delaware Continuation of application Ser. No. 234,679, Nov. 1, 1962. This application Sept. 1, 1965, Ser. No. 490,762
12 Claims. (Cl. 235—164)

This invention relates to digital computing circuits and more particularly, to digital arithmetic circuits for performing multiplications. This application is a continuation of application Ser. No. 234,679, filed Nov. 1, 1962.

Traditionally, digital computing circuits perform multiplication operations by successive additions of a multiplicand quantity controlled in accordance with the digits of a multiplier quantity. Thus, the multiplicand is added to itself and column shifted in repetitive operations and because of the repetition, the process is relatively slow and time consuming. Other multiplying circuits have been devised using core matrix circuits or the like wherein sensing leads associated with selected cores provide a digital indication of a product. Such a matrix arrangement is costly because of the core arrangements and because special current pulse generating circuits are required to reverse the magnetic polarity of the cores. Furthermore, a matrix arrangement must be provided with a means for propagating "carry" signals which may be generated by lower order multiplication operations and must be utilized to modify the higher order products. In a decimal system of multiplication, a "carry" from one order is usually less than the decimal 10 and may be passed to the next higher order. However, in binary multiplication, carries of 10 (decimal 2) and much greater are commonly encountered, and multiple-order carries must be propagated. The propagation of multiple order carry signals has proven to be awkward and time consuming.

It is an object of this invention to provide an improved and fast multiplication system using a matrix of inexpensive components, and more particularly, it is an object to provide a matrix of inverter-gate or "NOR" circuits electrically arranged in rows and columns for receiving two groups of digital input signals representative of quantities X and Y to be multiplied.

It is another object of this invention to provide an improved multiplying system using an electrical matrix of NOR circuits in combination with encoder adder circuits which will provide a digital output signal and will provide fast and accurate multiple order carry propagation from the lower order circuits to the greater order circuits.

Another object is to provide an improved multi-level adder for receiving multiple input signals and for generating a sum output signal together with a first order carry signal and a carry signal of a higher order which may be directly passed to other adders associated with the higher orders of output digits.

Numerous other objects and advantages will be apparent throughout the progress of the specification which follows. The accompanying drawings illustrate a certain exemplary embodiment of the invention and the views therein are as follows.

Figure 1:
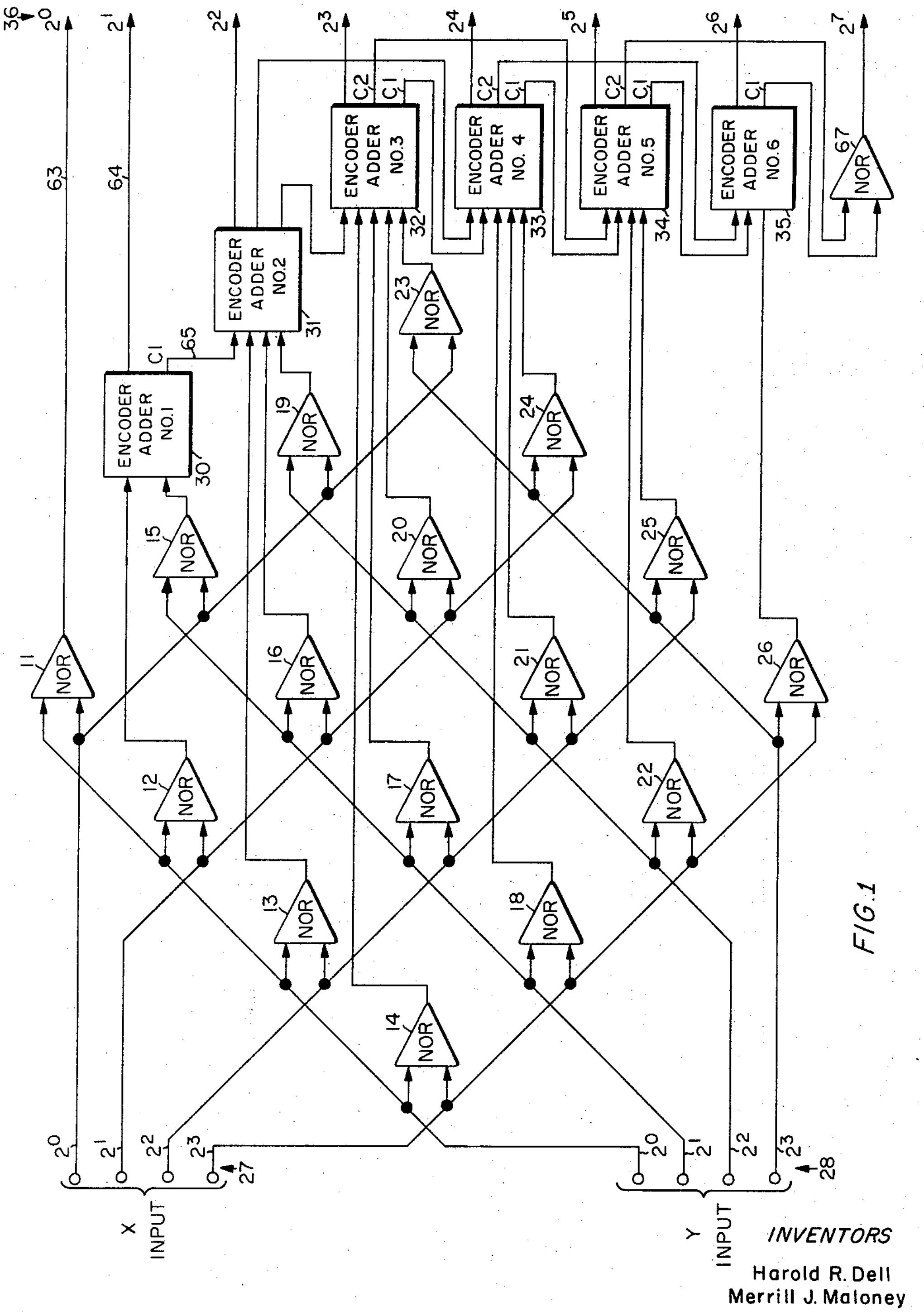
FIGURE 1 is a circuit diagram of the matrix multiplier of this invention illustrating the arrangement of NOR circuits and encoder adder circuits.

Briefly stated, according to a preferred embodiment of this invention, a plurality of NOR circuits 11 through 26 is arranged in a matrix as shown in FIGURE 1. Digital input signals may be applied to input terminals 27 connecting to the rows of the matrix which are shown as conductive leads extending downwardly to the right and couple to an input lead of each of the NOR circuits of the respective rows. A second group of input terminals 28 will pass further signals to leads extending upwardly to the right in columns of the matrix and connecting with further input terminals of the respective NOR circuits. Each of the NOR circuits 11 through 26 includes an output lead which passes signals along the diagonals of the matrix to input terminals of respective encoder adder circuits 30 through 35. Each of the encoder adder circuits includes a plurality of input terminals each coupled to one of the output leads from the NOR circuits of the matrix diagonals and further input terminals which may be coupled to carry signal output leads of lower order encoder adder circuits. Output signals representative of the product of the two input quantities will appear at the various output terminals 36.

Briefly, the encoder adder circuits include a first transistor 38 (see FIGURE 3) for generating a sum output signal and further transistors 39 and 40 for generating first and second order carry output signals respectively. While each of the transistors is normally biased into a state of non-conduction, the input signals which may appear on any combination or all of the input terminals 41 are coupled to each of the transistors by analog resistors and will tend to bias the transistors into conduction. In the case of the sum output transistor 38, the biasing is such that a signal applied to any one of the input terminals 41 will cause the transistor 38 to become conductive. In the case of the first order transistor 39, a signal appearing on any two of the input terminals 41 will cause the transistor 39 to become conductive. A resistive means 43 coupled between the transistors 38 and 39 will cancel the effective bias from any two of the input terminals to inhibit conduction of the transistor 38. However, biasing currents received from three or more of the input signals will overcome the effect of the biasing resistor 43 to restore the transistor 38 into conduction. The biasing of the second order carry transistor 40 is such that four simultaneous input signals must be received to cause conduction therein for the generation of a second order carry signal. When the second order carry transistor 40 conducts, a resistive means 44 will tend to inhibit conduction of the transistor 38, and a resistive means 45 will tend to inhibit conduction of the transistor 39. However, when simultaneous input signals are received on all five input terminals, the effect of the inhibiting bias through the resistor 44 will be overcome and conduction will be restored in the transistor 38.

The NOR circuits of FIGURE 1 may be of the type described in an article entitled "A Generalized Resistor-Transistor Logic Circuit and Some Applications" by Dr.

Figure 2:
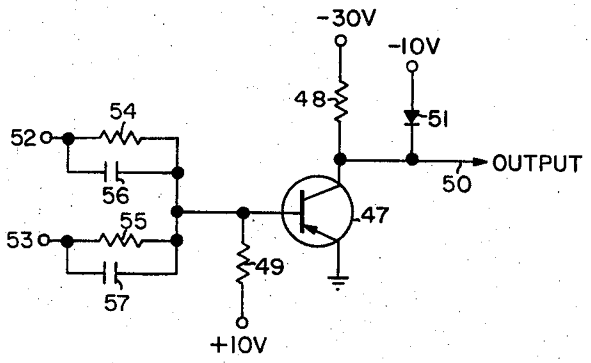
FIGURE 2 is a circuit diagram of a typical NOR circuit which is shown in blocks in FIGURE 1.

S. C. Chao beginning on page 8 of IRE Transactions on Electronic Computers, Volume EC-8 No. 1, March 1959. The operation of the NOR circuits may be understood with reference to FIGURE 2. Each NOR circuit includes a transistor 47 which functions as an inverter-amplifier. The emitter electrode of the transistor 47 is directly coupled to ground reference potential and the collector electrode is coupled to a negative reference voltage by a load resistor 48. The base electrode of the transistor 47 is coupled to a positive reference potential by a resistor 49 which normally biases the transistor 47 into a state of non-conduction. When the transistor 47 is non-conductive, the output signal appearing at a terminal 50 will assume a negative reference voltage which is accurately regulated by a clamping diode 51. As shown in FIGURE 2, the diode 51 is coupled to a negative 10 volts reference potential and as such will maintain the output voltage from the NOR circuit at this voltage (minus 10 volts) at all times when the transistor 47 is in a state of non-conduction. The load resistor 48 provides a conductive path for currents which are supplied to any subsequent circuitry which may be coupled to the output terminal 50 while the diode 51 maintains the voltage regulation.

The NOR circuit of FIGURE 2 is shown with two input terminals 52 and 53 each coupled to the base electrode of the transistor 47 via a resistor 54–55. The input signals applied to the terminals 52 and 53 may be deemed to vary between zero voltage (ground potential) and a negative 10 volt reference voltage. If both of the input terminals remain grounded (no input signals), the effect of the positive biasing potential via the resistor 49 will maintain the transistor 47 in the state of non-conduction, and the output voltage appearing at the terminals 50 will be maintained at the negative 10 volt reference level. However, if negative input signals are impressed upon either or both of the terminals 52 and 53, the base electrode of the transistor 47 will become negatively biased with respect to the grounded emitter electrode, and the transistor will conduct. When conductive, the transistor 47 will effectively ground the output terminal 50 causing a zero output voltage. It will therefore be appreciated that the output signal from the NOR circuits will be a negative 10 volt reference voltage when no negative input signals are impressed upon either of the input terminals. If a negative signal is impressed on either or both input terminals, the output voltage will become zero or substantially ground potential. As shown in FIGURE 2, the input resistors 54 and 55 are bypassed by parallel connected capacitors 56 and 57 which will effectively improve the response characteristic of the circuit by decreasing the time required for the circuit to respond to changing input voltages. Thus, when a steep front of a square wave appears at either of the input terminals 52 and 53, the high frequencies will be passed by the capacitors to the transistor 47, while the steady state values of the square wave will be passed by the resistors. The NOR circuit of FIGURE 2 is illustrated with two input terminals in accordance with the requirements of the various NOR circuits shown in FIGURE 1.

Although FIGURE 2 shows a NOR circuit with two input leads, NOR circuits may be constructed with any desired number of inputs to fit the requirements of a circuit designer. From a logical or functional viewpoint, a NOR circuit as shown in FIGURE 2 is the equivalent of an AND circuit followed by an inverter. The multiple input elements all coupled to the single base electrode of the transistor 47 effectively constitutes a resistive AND circuit, and the transistor itself functions as an inverter and provides power gain. Obviously, the circuit of FIGURE 2 could be provided with but a single input terminal 52 and input impedance elements 54 and 56. In such a case, the circuit would constitute an inverter, and may be used as shown in the blocks 59, 60 and 61 of FIGURE 3 where it is desired to invert the sum and carry output signals for subsequent circuitry.

Figure 3:
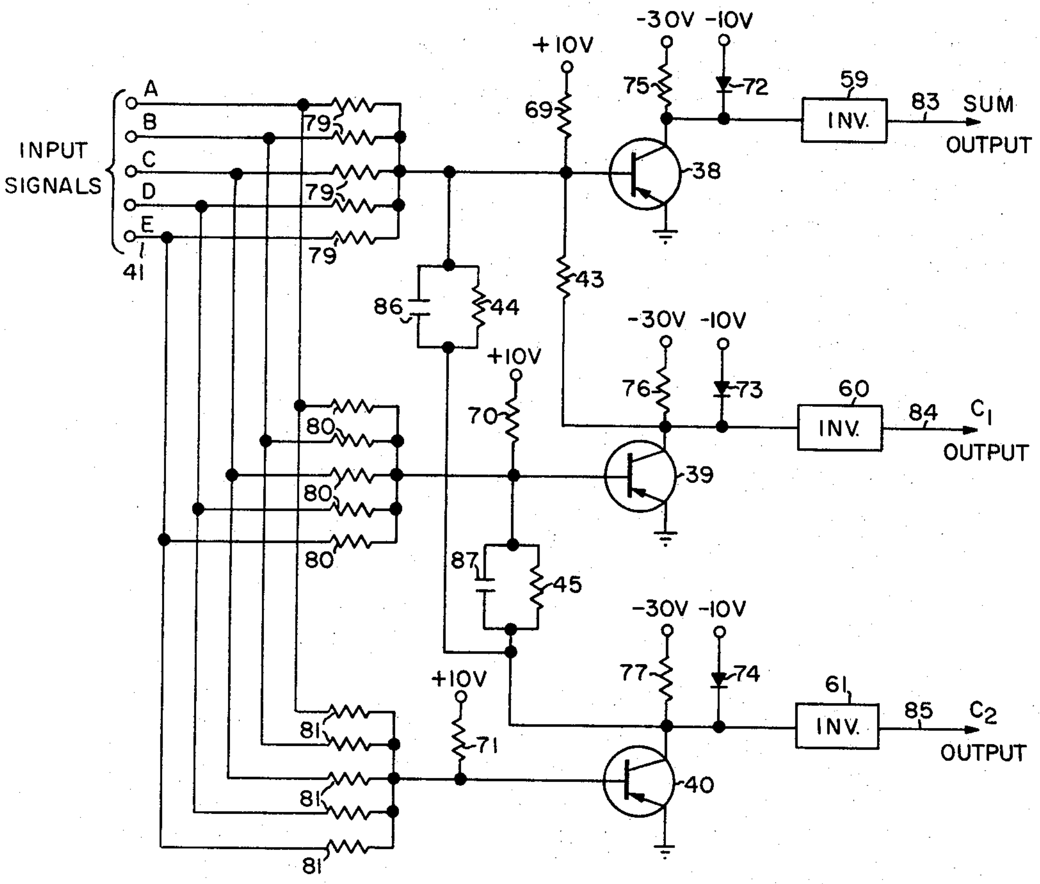
FIGURE 3 is a circuit diagram of a five input, three transistor encoder adder circuit which is shown as blocks in FIGURE 1.

The NOR circuits 11 through 26 are arranged in a rectangular pattern or matrix which is shown in FIGURE 1 with the X and Y axes (the rows and columns) extending obliquely. Each of the NOR circuits includes two input leads respectively connected to a row and a column lead from the X and Y input terminals 27 and 28. In the simplified circuit of FIGURE 1, the matrix includes 16 NOR circuits in a four by four rectangle and coupled to four X and four Y input terminals. In this arrangement, two four digit binary numbers may be multiplied together to obtain an eight digit binary product. A negative 10 volt input signal will be representative of the binary "0" while zero or ground voltage will be representative of the binary "1." The output signals appearing at the terminals 36 will likewise be of two discrete levels, but in this case, a negative 10 volts will be representative of the binary "1" while the zero or ground voltage will be representative of the binary "0." Obviously, if further circuitry of a computer requires different standards (i.e., 0 volts representative of a 1 and $-10$ volts representative of a 0) this may be accomplished by eliminating the inverter circuits 59 from the encoder adder circuits as shown by FIGURE 3, and by including an inverter circuit in an output lead 63.

The NOR circuit 11 is coupled to receive the least significant bit input signals from both the X input terminals 27 and the Y input terminals 28, and the output lead 63 from the NOR circuit 11 provides an indication of the least significant product bit. In the multiplication of the least significant bits, if either or both of the bit inputs are binary 0's, the output signal on the lead 63 will be a binary 0, but if both inputs to the NOR circuit 11 are representative of a binary 1, the signal on the output lead 63 will likewise be representative of a binary 1. The NOR circuit 12 and the NOR circuit 15 are coupled to the least significant input terminal of one of the groups of terminals 27–28 and the second or next more significant terminal of the other group. If both inputs to either the NOR circuit 12 or the NOR circuit 15 are binary 1's, the output therefrom will be a binary 1 of the second order. The encoder adder circuit 30 will generate a binary 1 of the second order product output signal if a binary 1 appears from either the NOR circuits 12 or 15. However, if a binary 1 appears from both such circuits 12 and 15, the encoder adder circuit 30 will combine the signals to generate a 0 output signal on a lead 64 and a first order carry signal on a lead 65 which is passed to the next most significant order or the encoder adder circuit 31.

By similar logic, we may conclude from the matrix arrangement of FIGURE 1 that each of the NOR circuits 11 through 26 will pass output signals along the various leads of the respective matrix diagonal to the encoder adder circuits which are associated with particular binary orders of the product output. In each case, if more than one signal appears from the NOR circuits of a single matrix diagonal, the various signals are added together with carry signals from lower orders by the encoder adder circuits 31 through 35. A final or most significant bit representative of the binary quantity $2^7$ (decimal 128) will be generated by a NOR circuit 67 which may receive either a first order carry signal from the encoder adder 35 or a second order carry signal from the adder 34. It may be appreciated that no product combination of the two 4 bit binary input signals X and Y will produce a binary product number of greater than $2^7$ (decimal 128), and more specifically, it may be appreciated from the mathematics that the encoder adder circuit 34 and the encoder adder circuit 35 cannot pass simultaneous carry signals to the NOR circuit 67.

The article by S. C. Chao, supra, discloses a binary full adder using two transistors for respectively generating sum and carry signals from combinations of input signals which may be impressed upon three input terminals. The adder circuit disclosed by this author is a transistorized version of a Kirchhoff Adder such as described on page 96 of a book by R. K. Richards entitled "Arithmetic Operations in Digital Computers" by the D. Van Nostrand Publishing Company. The transistorized Kirchhoff Adder combines the input signals with analog resistors to selectively bias the sum and carry transistors into conduction. A single input signal will be sufficient to bias the sum transistor into conduction to provide a sum output signal. The combination of two or three input signals will bias the carry transistor into conduction to generate a carry signal. A biasing resistor connecting between the carry transistor and the sum transistor tends to inhibit conduction in the sum transistor when the carry transistor is conductive. However, when three input signals are simultaneously applied to the Kirchhoff Adder, the carry transistor will become conductive, and the inhibiting effect thereof will be overcome such that the sum transistor will also become conductive, thereby generating both sum and carry output signals.

The encoder adder circuit of FIGURE 3 includes five input terminals 41 and three stages represented by the transistors 38, 39 and 40. Such a circuit may be used for the blocks 32 and 33 of FIGURE 1. As will be indicated subsequently, the blocks 30, 31, 34 and 35 may be a simplification of the circuit shown in FIGURE 3 in that certain of the components may be eliminated.

Each of the transistors 38, 39 and 40 includes an emitter electrode which is directly grounded, and a base electrode coupled to a positive reference potential by respective resistors 69, 70 and 71. With the base electrode of these transistors biased positively, the transistors will normally be in a state of non-conduction. As such the respective collector electrodes will assume a negative output potential which is clamped at the negative 10 volt level by respective diodes 72, 73 and 74. Respective load resistors 75, 76 and 77 each provide a path for current flow to load devices such as the inverter circuits 59, 60 and 61 which are coupled to and driven by the encoder adder circuits.

Each of the input terminals 41 is coupled to the base electrode of the transistor 38 via analog summing resistors 79. Similarly, each of the input terminals 41 are coupled to the base electrodes of the transistors 39 and 40 by corresponding summing resistors 80 and 81. The resistive values are so chosen that a single negative signal applied to any one of the terminals 41 will be passed by the corresponding resistor 79 and will overcome the positive biasing effect of the resistor 69 to cause the base electrode of the transistor 38 to be biased negatively with respect to ground whereupon the transistor 38 will become conductive. This circuit has been built and successively tested using values of 10,000 ohms for each of the analog input resistors 79, 80 and 81, and a value of 1540 ohms for the resistor 69. In this case, the transistor 38 is normally non-conductive, but a single input signal applied to one of the terminals 41 will render the transistor conductive to provide a zero voltage output signal at the collector electrode thereof. As shown in FIGURE 3, the inverter circuit 39 will provide a final sum output at a terminal 83 such that a negative reference potential is indicative of a binary 1.

In the case of the first order carry transistor 39, the resistor 70 is chosen to have a value of 1820 ohms, and as such will maintain the transistor 39 normally non-conductive. The negative biasing effect of a single input signal applied through one of the analog resistors 80 will be insufficient to overcome the positive biasing effect of the resistor 70, and therefore, a single input signal will not render the transistor 39 conductive. However, when two simultaneous negative voltages are applied to any two of the input terminals 41, the combined biasing effect of two of the resistors 80 is sufficient to overcome the inhibitive biasing of the resistor 70, and the transistor 39 will be rendered conductive. Therefore, a first order carry signal will not appear at the output terminal 84 unless simultaneous input signals are applied to at least two of the input terminals 41.

A resistor 43 is normally coupled to a negative 10 volt biasing point of the collector electrode of the transistor 39. This biasing effect is combined with the biasing effect of the resistor 69. When the transistor 39 becomes conductive, the collector electrode thereof assumes a zero or ground voltage, and the negative biasing effect of the resistor 43 is eliminated. This may be deemed to be the equivalent of providing further positive bias to the transistor 38 at times when the transistor 39 is conductive. The value of the resistor 43 has been established at 5,000 ohms, as compared to the values of the analog input resistors 79 which are 10,000 ohms, and the effective conductivity or biasing effect of the resistor 43 is therefore twice that of the analog resistor 79. When the transistor 39 is conductive, the effective positive bias applied to the transistor 38 via the resistor 43 is substantially equal to the negative bias of two simultaneous input signals applied through the resistors 79. The positive bias of the resistor 43 has an inhibiting effect on the transistor 38 tending to hold this transistor in a state of non-conduction.

As indicated heretofore, a single input signal impressed upon one of the terminals 41 will render the transistor 38 conductive. On the other hand, two input signals simultaneously impressed upon the terminals 41 will result in an inhibiting bias causing the transistor 38 to become nonconductive. However, if three simultaneous input signals are applied to the input terminals 41, the inhibiting bias will be overcome, and the transistor 38 will again become conductive to produce a sum output signal. Thus, we will appreciate that a single input signal will result in a sum output signal with no first order carry; that two simultaneous input signals will result in no sum output signal but a first order carry output signal; and that three simultaneous input signals will result in both a sum output signal and a first order carry signal.

The second order carry output signals are generated by the transistor 40 which is normally biased into a state of non-conduction by the resistor 71. The resistor 70 may be of a value of 2,800 ohms as compared to the analog resistors 81 having values of 10,000 ohms. The ratio of these resistors 71–81 is so chosen that the transistor 40 will be normally non-conductive, and will remain non-conductive with either 1, 2 or 3 simultaneous inputs being applied to the terminals 41. However, if four input signals are simultaneously applied to four of the terminals 41, the inhibitive biasing effect of the resistor 71 is overcome, and the transistor 40 is rendered conductive to generate a second order carry signal on an output lead 85. When the transistor 40 becomes conductive, an effective positive bias is applied via the resistor 44 to the base electrode of the transistor 38. A parallel capacitor 86 may shunt the resistor 44 to decrease the response time and effectively speed up the adding circuit. The resistor 44 may have a value of 2,500 ohms and as such will have four times the effective conductivity of the various analog resistors 79. Therefore, when four simultaneous input signals are received at the terminals 41, the transistor 40 becomes conductive and an inhibiting signal is applied to the transistor 38 which will overcome the effect of four simultaneous input signals to render the transistor 38 non-conductive. However, if five simultaneous input signals are applied to the terminals 41, the combined biasing effect of all five of the resistors 79 will overcome the inhibiting bias of the resistor 44, and the transistor 38 will be rendered conductive.

The operation of the sum output transistor 38 may be summarized by noting that this transistor is normally non-conductive (with no input signals); it will become conductive to generate a sum output signal when a single input appears; it will become non-conductive when two simultaneous input signals appear; it will again become conductive to generate a sum output signal when three simultaneous input signals appear; it will become nonconductive with four simultaneous input signals; and it will again become conductive and will generate a sum output signal when five simultaneous input signals are applied to the terminals 41.

The resistor 45 is coupled between the second order carry transistor 40 and the first order carry transistor 39. The resistor 45 may be of a value of 2,500 ohms as compared to the resistors 80 of a value of 10,000 ohms. It may be appreciated that the positive or inhibiting bias effect of the resistor 45 is equal to the negative biasing effect of four of the resistors 80. A capacitor 87 is connected in parallel with the resistor 45 to improve the response time of the circuit. As indicated heretofore, the transistor 39 will become conductive to generate a first order carry when at least two negative input signals are applied via the resistors 80 to the base electrode thereof. Obviously, the transistor 39 will remain conductive when three input signals are similarly applied thereto. When four input signals are impressed upon the terminals 41, the inhibiting bias of the resistor 45 will overcome the biasing effect of the resistors 80 and will cause the transistor 39 to become non-conductive. Similarly, the biasing effect of the resistor 45 will overcome the combined biasing effect of five simultaneous input signals maintaining the transistor 39 in a state of non-conduction.

The circuit of FIGURE 3 may logically be extended to include two additional analog resistors coupled to the base electrodes of the three transistors 38, 39 and 40 to provide a total of seven input terminals 41. If we were to extend this invention in this manner, we would appreciate that the simultaneous application of six signals would render the transistor 39 conductive in spite of the inhibiting effect of the transistor 40, and therefore, both a first order carry signal, and a second order carry signal would be generated. In this event, two inhibiting signals would be applied to the sum output transistor 38 via the respective resistors 43 and 44 and the combined effect of six input signals would not be sufficient to render the transistor 38 conductive. However, a seventh simultaneously applied input signal would overcome the inhibiting bias of both resistors 43 and 44 to render the transistor 38 conductive.

This invention may be extended further by the addition of further input terminals 41, further input resistors 79, 80 and 81, and one or more additional transistors having similar biasing logic to the carry transistors 39 and 40. Thus, with an additional carry transistor, third order carries could be generated for an enlarged matrix arrangement which would likewise be an extension of FIGURE 1. In general the invention can be extended to provide for the multiplication of a multiplicand having any convenient number of bits by a multiplier having the same or a different number of bits, if $n$ represents the number of multiplicand bits and $m$ represents the number of multiplier bits. The matrix will have $m$ times $n$ NOR circuits arranged in $m$ rows and $n$ columns. The highest order partial product is the coefficient of $2^{(m+n-2)}$ which is the output of the NOR circuit at the corner formed by the $m^{th}$ row and $n^{th}$ column. The successively lower orders of partial products being grouped on the $(m+n-3)$ lying between the highest order corner and the opposite corner which forms the least significant bit of the product, the coefficient of $2^0$. Considering these corners as "diagonals" there are $(m+n+1)$ of such diagonals in the $m$ by $n$ matrix. There is an equal number of oppositely sloping diagonals, which are of no interest and not regarded as "diagonals" as the term is used herein. Since the first order carry is generated by the simultaneous application of two input signals, and the second order carry is generated by four simultaneous input signals, it logically follows that a third order carry would be generated by eight simultaneous input signals, and a fourth order carry would be generated by sixteen simultaneous input signals, etc. In a similar manner, the further transistor (not shown) for generating a third order carry would pass an inhibiting bias to the transistors 38, 39 and 40 which would be equivalent to eight input signals.

The circuits as heretofore described utilize input signals which may be of either of two discrete voltage levels. The two voltage levels indicated above are −10 volts and 0 or ground volts. Similarly, the output circuits of FIGURES 2 and 3 will generate two such voltage levels. The ratios of the resistors 79, 80 and 81 to the other biasing resistors 43, 44, 45, 69, 70 and 71 as disclosed herein are based on the voltage levels which are established as positive and negative 10 volts and 0 volts. Obviously, the "effective conductivity" of the biasing resistors may be varied either by changing the ratios, the ohmic values or by changing the ratios of voltages applied thereto.

The matrix multiplier of this invention has proven to be substantially faster in operation than those multipliers which perform repeated additions and shift operations of the multiplicand quantity to obtain the product quantity. For example, the multiplication of two 24 bit binary numbers by the method of repeated additions will require approximately 45 microseconds in presently available digital computers. Using a 24 by 24 matrix in accordance with the teachings of this invention, the same multiplication may be performed in approximately 3.5 microseconds.

The encoder adder circuits of this invention essentially make it possible to add a column of binary digits in a single operation. As indicated heretofore, the circuit of FIGURE 3 may be expanded to include five transistors with 31 input terminals. Such a circuit will propagate signals representative of first order carries, second order carries, third order carries and fourth order carries. In such an arrangement, the adding circuits of higher orders will require that some of the input terminals be connected to the carry output terminals of the lower order adding circuits thereby decreasing the number of input terminals available for receiving signals from the NOR circuits of the matrix. Such encoder adder circuits having 28 input terminals could be used in conjunction with a 24 by 24 matrix of NOR circuits wherein 24 input terminals may be coupled to the NOR circuits of the longest matrix diagonal, and four input terminals may be coupled to receive carry signals from lower order adders.

Changes may be made in the form, construction and arrangement of the parts without departing from the spirit of the invention or sacrificing any of its advantages, and the right is hereby reserved to make all such changes as fall fairly within the scope of the following claims.

The embodiments of the invention in which an exclusive property or privilege is claimed are defined as follows:

1. A multiplier comprising a plurality of NOR circuits each having two input leads and an output lead, each NOR circuit being operable to generate an output signal on the output lead when no input signals appear on either of the input leads, and being operable to provide no signal on the output lead when an input appears on at least one of the input leads, said multiplier including two groups of input terminals for receiving two respective groups of binary coded signals, the input leads of each of the NOR circuits being coupled respectively to one of the input terminals of each group, and a plurality of encoder adder circuits each having a plurality of input leads and an output lead, the input leads of encoder adder circuits being coupled to respective ones of the output leads of the NOR circuits, and the output leads being operable to generate binary signals corresponding to the product of the binary signals impressed upon the respective groups of input terminals, said encoder adder circuits being coupled to each other to propagate carry signals from one encoder adder circuit to another.

2. A multiplier comprising a plurality of NOR circuits electrically arranged in rows and columns forming a matrix, each NOR circuit having two input leads and an output lead and being operable to generate an output signal on the output lead only at times when no input signals are impressed on either of the input leads, said matrix including two groups of input leads extending respectively along the rows and columns of the matrix and being operable to receive two respective groups of binary coded input signals, and a plurality of encoder adder circuits having input terminals coupled to the output leads of the NOR circuits of a respective diagonal of the rectangular matrix, each of said encoder adder circuits having an output terminal for generating a sum signal, said encoder adder circuits being coupled to each other for passing signals representative of carries.

3. A binary multiplier comprising a plurality of NOR circuits electrically arranged in rows and columns forming a matrix, each NOR circuit including a pair of input leads and an output lead and being operable to generate an output signal on the output lead only when no input signals are impressed on either input lead, said matrix including two groups of input terminals for respectively receiving two sets of binary coded signals to be multiplied, the input terminals of a first group being coupled to input leads of the NOR circuits forming respective columns of the matrix the input terminals of the second group being coupled to the other input leads of the NOR circuits forming respective rows of the matrix, and a plurality of encoder adder circuits each having a plurality of input leads, the output leads of the NOR circuits which form diagonals of the matrix being coupled to the input leads of respective encoder adder circuits, each encoder adder circuit having a sum output lead for generating binary coded signals representative of the product of the two groups of binary signals, said encoder adder circuits further including at least one carry signal output lead coupled to further input leads of encoder adder circuits of higher orders.

4. A binary multiplier comprising a plurality of NOR circuits electrically arranged in rows and columns forming a matrix, each NOR circuit including a pair of input leads and an output lead and being operable to generate an output signal on the output lead only when no input signals are impressed on either input lead, said matrix including two groups of input terminals for respectively receiving two sets of binary coded signals to be multiplied, the input terminals of a first group being coupled to input leads of the NOR circuits forming respective columns of the matrix, the input terminals of the second group being coupled to the other input leads of the NOR circuits forming respective rows of the matrix, and a plurality of encoder adder circuits each having a plurality of input leads, the output leads of the NOR circuits which form diagonals of the matrix being coupled to the input leads of respective encoder adder circuits, each encoder adder circuit having a sum output lead for generating a signal representative of a binary order of digits of the product, said encoder adder circuits further including an output lead for passing a first order carry signal to an input lead of the next successive encoder adder circuit, the encoder adder circuits associated with longer diagonals of the matrix and having at least four input leads further including another output lead for passing a second order carry signal to an input lead of a subsequent encoder adder circuit which passes signals of a second greater order of digits.

5. A binary multiplier comprising a plurality of NOR circuits electrically arranged in rows and columns forming a matrix, each NOR circuit having two input leads and an output lead and being operable to generate an output signal on the output lead only when no input signals are impressed on either of the input leads, said matrix including two groups of input terminals coupled to the input leads of the NOR circuits along respective rows and columns, a plurality of encoder adder circuits each having a plurality of input leads coupled to the output leads of the NOR circuits along respective diagonals of the matrix, each of the encoder adder circuits associated with the longer diagonals of the matrix and having at least four input leads including a first transistor for generating a sum output signal, a second transistor for generating a first order carry output signal, a third transistor for generating a second order carry output signal, means for biasing each of the transistors into a normal state of non-conduction, resistive means coupled between the input leads of the encoder adder circuit and each of the transistors for passing signals from the NOR circuits which tend to bias the respective transistors into conduction, resistive means coupled between the second transistor and the first transistor for passing a signal which will tend to inhibit conduction in the first transistor when the second transistor is conductive, and resistive means coupled between the third transistor and the first transistor for passing a signal which will tend to inhibit conduction in the first transistor when the third transistor is conductive.

6. A binary multiplier comprising a plurality of NOR circuits electrically arranged in rows and columns forming a matrix, each NOR circuit including a pair of input leads and an output lead and being operable to generate an output signal on the output lead only when no input signals are impressed on either input lead, said matrix including two groups of input terminals for respectively receiving two sets of binary coded signals to be multiplied, the input terminals of a first group being coupled to input leads of the NOR circuits forming respective columns of the matrix, and the input terminals of the second group being coupled to the other input leads of the NOR circuits forming respective rows of the matrix, and a plurality of encoder adder circuits each having a plurality of input leads, the output leads of the NOR circuits which form diagonals of the matrix being coupled to the input leads of respective encoder adder circuits, each encoder adder circuit associated with one of the longer diagonals of the matrix and having at least four input leads including a first transistor for generating a sum output signal, a second transistor for generating a first order carry output signal, a third transistor for generating a second order carry output signal, means for biasing each of said transistors normally into a state of non-conduction, a plurality of analog summing resistors coupled between each of the input leads and each of the transistors for passing input signals which will tend to bias the respective transistors into conduction, resistive means coupled between the second transistor and the first transistor for passing a signal which will tend to inhibit conduction in the first transistor when the second transistor is conductive, resistive means coupled between the third transistor and the first transistor for passing a signal which will tend to inhibit conduction in the first transistor when the third transistor is conductive, and further resistive means coupled between the third transistor and the second transistor for passing a signal which will tend to inhibit conduction in the second transistor when the third transistor is conductive, said first transistor being operable to conduct and to generate a sum output signal when an input signal is impressed upon one of the input leads, said second transistor being operable to conduct and to generate a first order carry signal when input signals are impressed upon two of the input leads, said third transistor being operable to conduct and to generate a second order carry signal when input signals are impressed upon four of the input leads, the first order carry signal from the second transistor of each encoder adder circuit being coupled to an input lead of another encoder adder circuit for generating the next higher order of sum signals, and the second order carry signal from the third transistor being coupled to an input lead of yet another encoder adder circuit for generating a sum signal of a second higher order.

7. Apparatus for generating electrical signals representative of the product of a binary $n$-bit multiplicand multiplied by a binary $m$-bit multiplier comprising, (a) an electrical matrix of *mn* NOR-circuits arranged in *m* rows and *n* columns each of said rows corresponding to a bit of said multiplier, and each of said columns corresponding to a bit of said multiplicand;

(i) each one of said NOR-circuits having a first input connected to a source of an electrical signal representative of the bit of said multiplicand corresponding to column of said one circuit and (ii) said one circuit having a second input connected to a source of an electrical signal representative of the bit of said multiplier corresponding to the row of said one circuit, (iii) said each one of said NOR-circuits being arranged to respond to said inputs if, and only if neither of said inputs is zero, said NOR-circuits thereby forming output electrical signals which represent the least significant bit of said product formed by the corner one of said NOR-circuits having input signals representative of the least-significant bits of said multiplicand and of said multiplier and the $(mn-1)$ partial products of said multiplicand and multiplier, said least bit and said partial products from the lowest to the highest order being arranged along the $(m+n-1)$ diagonals of said matrix the lowest order partial products appearing at the output of the two NOR said corner circuit, the highest order partial product appearing at the opposite corner NOR-circuit considered to constitute a diagonal, (b) and means for sensing the cardinal number of one-representative output signals plus carries, if any, on each of the $(m+n-2)$ of said diagonals of said matrix which contains an order of partial products, beginning with the lowest said order, and responsive to each said number for generating the corresponding product bit, first-order carry, and higher order carries as required; and (c) means for adding carries beyond said highest order diagonal.

8. Apparatus for generating the product of a binary multiplicand multiplied by a binary multiplier comprising, (a) a matrix of NOR-circuits arranged in rows and columns each of said rows corresponding to a bit of said multiplier, and each of said columns corresponding to a bit of said multiplicand;

(i) each one of said NOR-circuits having a first input connected to a source representative of the bit of said multiplicand corresponding to column of said one circuit and (ii) said one circuit having a second input connected to a source representative of the bit of said multiplier corresponding to the row of said one circuit, (iii) said each one of said NOR-circuits being arranged to respond to said inputs if, and only if neither of said inputs is zero, said NOR-circuits thereby forming output signals which represent the least significant bit of said product formed by the corner one of said NOR-circuits having input signals representative of the least-significant bits of said multiplicand and of said multiplier and the partial products of said multiplicand and multiplier, said least bit and said partial products from the lowest to the highest order being arranged along the diagonals of said matrix the least significant bit appearing at the output of said corner circuit, the highest order partial product appearing at the opposite corner NOR-circuit, (b) means for sensing the cardinal number of one-representative output signals plus carries, if any on each of said diagonals of said matrix which contains an order of partial products, beginning with the lowest said order, and responsive to each said number for generating the corresponding product bit, first-order carry, and higher order carries as required; and (c) means for adding carries beyond said highest order diagonal.

9. Apparatus for multiplying a binary multiplicand by a binary multiplier comprising an electrical matrix of NOR-circuits for generating the partial products of multiplying each bid of said multiplicand by each bit of said multiplier, and for electrically arranging said partial products in matrix form; means for sensing the number of ones on each of the diagonals of said matrix, and responsive to each said number for generating the corresponding output bit, first order carry, and higher order carries, as required; and means for adding said carries to said number for higher order diagonals.

10. Apparatus for multiplying a binary multiplicand by a binary multiplier comprising an electrical matrix of NOR-circuits for generating the partial products of multiplying each bit of said multiplicand by each bit of said multiplier, and for electrically arranging said partial products in matrix form and an encoder adder for sensing the number of ones on the longest diagonal of said matrix together with carries, if any from lower order diagonals, and responsive to said number for generating the corresponding output bit, first order carry, and higher order carries, as required.

11. Apparatus for multiplying a binary multiplicand by a binary multiplier comprising an electrical matrix of NOR-circuits for generating the partial products of multiplying each bit of said multiplicand by each bit of said multiplier, and for electrically arranging said partial products in matrix form; analog means for summing the outputs of said circuits on each of the diagonals of said matrix which contains an order of partial products, beginning with the lowest order, and encoders connected to said means for generating for each said diagonal the corresponding output bit, first order carry, and higher order carries, as required.

12. Apparatus for multiplying a binary multiplicand by a binary multiplier comprising a matrix of NOR-circuits for generating the partial products of said multiplicand and said multiplier, and for arranging said partial products in matrix form; analog means for combining the outputs of the NOR circuits on each of the diagonals of said matrix which contains an order of partial products, to obtain their sums beginning with the lowest order, encoder means responsive to each said sum for generating the corresponding output bit, first order carry, and higher order carries, as required; and means for adding said carries to said number for higher order diagonals.

References Cited

UNITED STATES PATENTS

| | | | |
|---|---|---|---|
| 3,063,636 | 12/1962 | Sierra | 235—153 |
| 3,125,675 | 3/1964 | Jeeves | 235—175 |

OTHER REFERENCES

Cavalieri, Jr. (I): What's Inside Transac-1, Electronic Design, July 1, 1956, pp. 22–25 TK 7800 E (51).

Cavalieri, Jr. (II): What's Inside Transac-II, Electronic Design, July 15, 1956, pp. 30–33 TK 7800 E (51).

MALCOLM A. MORRISON, *Primary Examiner.*

MARTIN P. HARTMAN, *Examiner.*